United States Patent [19]
Ogawa

[11] 4,217,611
[45] Aug. 12, 1980

[54] OPTOELECTRONIC SCANNING APPARATUS

[75] Inventor: Mutsuo Ogawa, Tokyo, Japan

[73] Assignee: Ricoh Company, Ltd., Tokyo, Japan

[21] Appl. No.: 906,107

[22] Filed: May 15, 1978

[30] Foreign Application Priority Data

May 16, 1977 [JP] Japan .................................. 52/56769

[51] Int. Cl.² .......................................... H04N 1/02
[52] U.S. Cl. .................................. 358/294; 358/285; 358/213
[58] Field of Search .................. 358/285, 288, 213, 2, 358/214, 215, 294

[56] References Cited

U.S. PATENT DOCUMENTS

| | | | |
|---|---|---|---|
| 3,121,138 | 2/1964 | Murphy | 358/294 |
| 3,609,225 | 9/1971 | Stallard | 358/285 |
| 3,867,569 | 2/1975 | Watson | 358/294 |
| 4,081,843 | 3/1978 | Okamo | 358/213 |
| 4,134,135 | 1/1979 | Inokuchi et al. | 358/294 |
| 4,150,873 | 4/1979 | Dali | 358/294 |

Primary Examiner—John C. Martin
Assistant Examiner—Edward L. Coles
Attorney, Agent, or Firm—David G. Alexander

[57] ABSTRACT

Main scan pulses are applied to a CCD charge accumulation type linear photosensor array to effect horizontal scan of a linear portion of a light image of an original document focussed on the array. The document is moved by one increment each time the array is scanned to effect vertical scan. Scanning is performed intermittently under control of a run length encoder. The main scan pulses are delayed while the document is moved by one increment when the encoder causes scanning to begin.

7 Claims, 5 Drawing Figures

OPTOELECTRONIC SCANNING APPARATUS

BACKGROUND OF THE INVENTION

The present invention relates to an optoelectronic scanning apparatus which may be advantageously incorporated into a facsimile transmitter.

In a scanning apparatus of the present type, a light image of a linear portion of an original document is focussed onto a linear photosensor array of the charge accumulation type. Typical of this type of array is a charge coupled device (CCD) array.

In such an array, light incident on photosensor elements of the array causes accumulation of charge in proportion to incident light intensity and time. The output signals of the elements correspond to the accumulated charge. The array also comprises an analog shift register into which the output signals of the elements are transferred in parallel. Main scan pulses cause the signals to be serially fed out of the shift register.

This operation constitutes a main or horizontal scan of the light image of the document. During the main scan the document is moved by one increment perpendicular to the array to effect vertical or subscan.

While the basic prior art apparatus of this type is generally feasible in practical application, a certain amount of distortion is encountered when the apparatus is employed in conjunction with a data compression unit such as a run length encoder. Such a compression unit operates at variable speed which depends on the original document. Where the document contains a large proportion of dark areas, the compression process is relatively slow. For this reason, it is often necessary to interrupt scanning to prevent the data fed from the array into the encoder from exceeding the capacity of the encoder.

When the array is controlled by the encoder to begin or resume scanning, the array is scanned simultaneously with moving the document for vertical scan. As a result, the area covered in the vertical direction by each photosensor element for the current scan line corresponds only to the area of the photosensor element. This differs greatly from continuous scanning where the area covered in the vertical direction by each element corresponds to the product of the width of the element in the horizontal direction and the distance the document is moved relative to the array plus the area of the element. This is because when scanning is begun the output signals of the elements are immediately transferred to the shift register and thereafter fed out. The document is at rest when the transfer is made. Thus, not only is the accumulated charge different from that in continuous scan but image areas between scan lines are not scanned.

SUMMARY OF THE INVENTION

In accordance with the present invention optical means focus a light image of a linear portion of an original document onto a charge accumulation type linear photosensor array. Main scan means are operative to continuously scan the array to thereby scan the document in a main scan direction. Subscan means are operative to continuously produce relative movement between the document and the array by one increment each time the main scan means scans the array to thereby scan the document in a subscan direction which is perpendicular to the main scan direction. Scan enable means control the main scan means and subscan means to begin and continue scanning. Control means control the main scan means to delay scanning the array while the subscan means produce relative movement between the document and the array by one increment when the scan enable means and subscan means begin scanning.

It is an object of the present invention to provide an optoelectronic scanning apparatus which prevents loss of image information when operated in an intermittent manner under the control of a run length encoder or the like in a facsimile transmitter.

It is another object of the present invention to provide an optoelectronic scanning apparatus which prevents distortion when operated in an intermittent manner.

It is another object of the present invention to provide a generally improved optoelectronic scanning apparatus.

Other objects, together with the foregoing, are attained in the embodiment described in the following description and illustrated in the accompanying drawing. cl BRIEF DESCRIPTION OF THE DRAWING FIG. 1 is a general schematic view of an optoelectronic scanning apparatus embodying the present invention;

DESCRIPTION OF THE PREFERRED EMBODIMENT

While the optoelectronic scanning apparatus of the invention is susceptible of numerous physical embodiments, depending upon the environment and requirements of use, substantial numbers of the herein shown and described embodiment have been made, tested and used, and all have performed in an eminently satisfactory manner.

Figure 1:
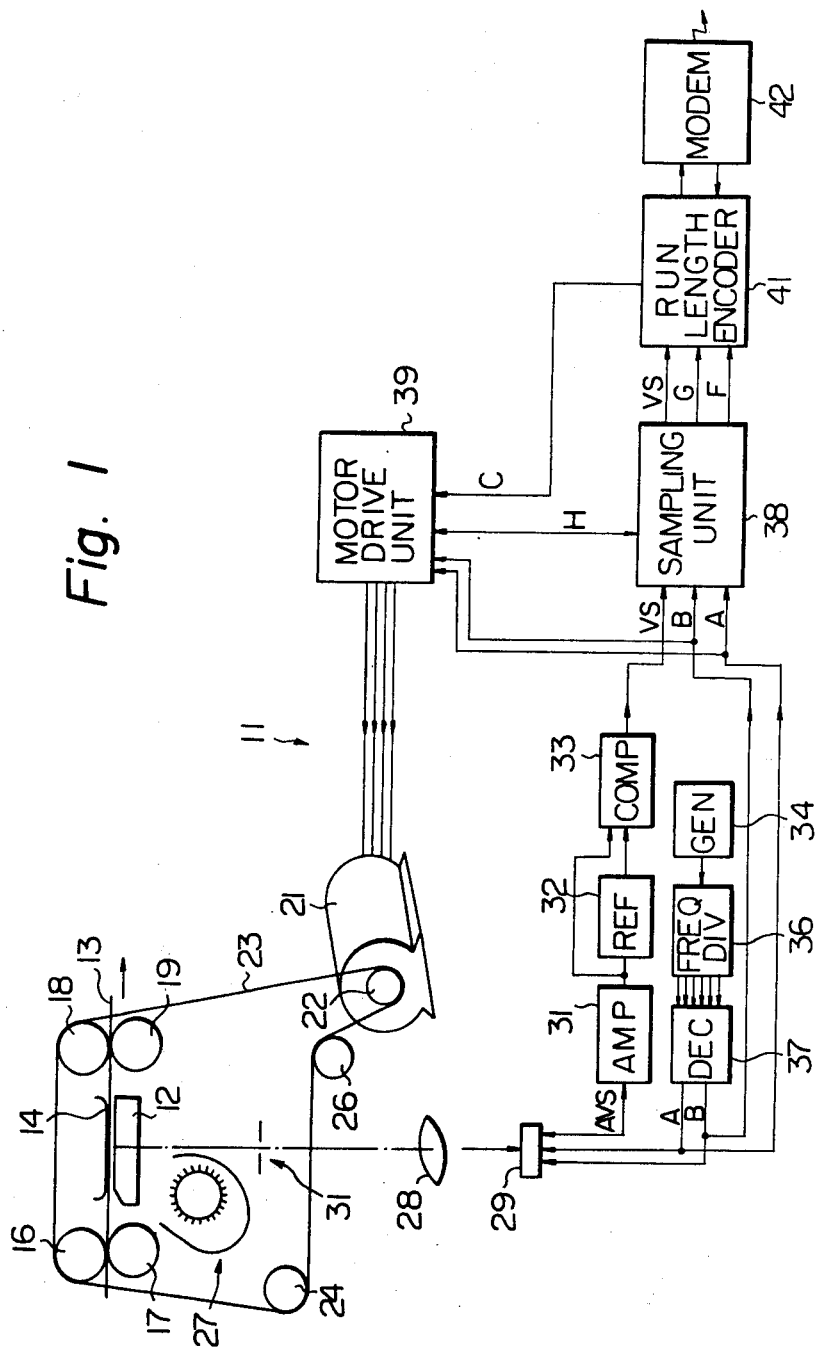

Referring now to FIG. 1 of the drawing, an optoelectronic scanning apparatus embodying the present invention is generally designated by the reference numeral 11 and comprises a transparent glass platen 12 which supports an original document 13 face down. A pressure plate 14 presses the document 13 against the platen 12.

Inlet feed rollers 16 and 17 in combination with outlet feed rollers 18 and 19 feed the document 13 rightwardly over the platen 12 in a manner which will be described in detail below. A drive motor 21 has a pulley 22 fixed to an output shaft of the motor 21 which is not shown. The drive rollers 16 to 19 are rotatably driven from the motor 21 by means of a belt 23 trained around the drive rollers 16 and 18 and the pulley 22. Further illustrated are an idler roller 24 and tension roller 26 around which the belt 23 is trained.

The document 13 is illuminated from below by a light source 27. An optical means here shown as a converging lens 28 focusses a light image of a linear portion of the document 13 onto a linear photosensor array 29 through an elongated slit 31.

The array 29 is of the charge accumulation type and is advantageously embodied as a charge coupled device (CCD). Although not shown in detail, the array 29 comprises a number of photosensor elements arranged in a row which produce voltage outputs corresponding to incident light intensity and time. In response to a line synchronization pulse A, the output signals of the photosensor elements are transferred in parallel into an analog shift register (not shown). Then, main scan pulses B are fed to the array 29 to cause the signals to be shifted out of the shift register. This accomplishes main (horizontal) scan of the document 13 in the form of one scan line.

Each time the array 29 is scanned, subscan pulses E are fed to the motor 21 to cause the document 13 to be moved perpendicular to the array 29 by one increment. As illustrated, four subscan pulses E cause the document 13 to be moved by one increment. Subscan or vertical scan is accomplished in this manner.

The output signals of the array 29, which are in analog form, are designated as AVS and are fed through an amplifying and wave shaping unit 31 to a comparator 32. The comparator 32 compares the signal AVS with a reference voltage from a reference voltage unit 33 to quantize the signals into binary form. When one of the signals AVS has a higher level than the reference voltage the comparator 32 produces a high output, and vice-versa. In this manner, the comparator 32 produces logically high signals VS corresponding to dark areas of the document 13 and logically low signals VS corresponding to light or background areas of the document 13.

The pulses A and B are produced by a pulse generating circuit (not designated) which comprises a clock pulse generator 34, a frequency divider 36 and a decoder 37. The frequency divided output pulses from the frequency divider 36 are decoded in a manner which will become apparent from further description and fed to the array 29, a sampling unit 38 and a motor drive unit 39.

The sampled output signals VS from the sampling unit 38 along with main scan pulses F and line synchronization pulses G derived from the pulses A and B respectively are fed to a run length encoder 41 which comprises a buffer memory or register (not shown). The encoder 41 functions to compress the data signals VS for transmission by producing codes corresponding to the numbers of consecutive logically high and low data signals VS. The run length encoder 41 may be of any known construction and is not the subject matter of the present invention.

When the document 13 has a high proportion of dark areas, the operating speed of the encoder 41 will become lower than the scanning speed and the data signals VS will accumulate in the buffer memory. When the capacity of the buffer memory is used up, the encoder 41 controls the sampling unit 38 to interrupt scanning until sufficient space in the buffer memory is available for another scan line. This is accomplished by feeding a read enable signal C to the motor drive unit 39 as long as sufficient space is available in the buffer memory to store another scan line. The drive unit 39 produces a motor drive signal D and also feeds a signal H to the sampling unit 38 as a sampling or scan enable signal as will be described in detail below. The output of the encoder 41 is connected to a modem 42 which modulates the signals VS for transmission to a remote receiver (not shown). The modem 42 feeds various synchronization signals to the encoder 41 which are not important for an understanding of the present invention.

Figure 2:
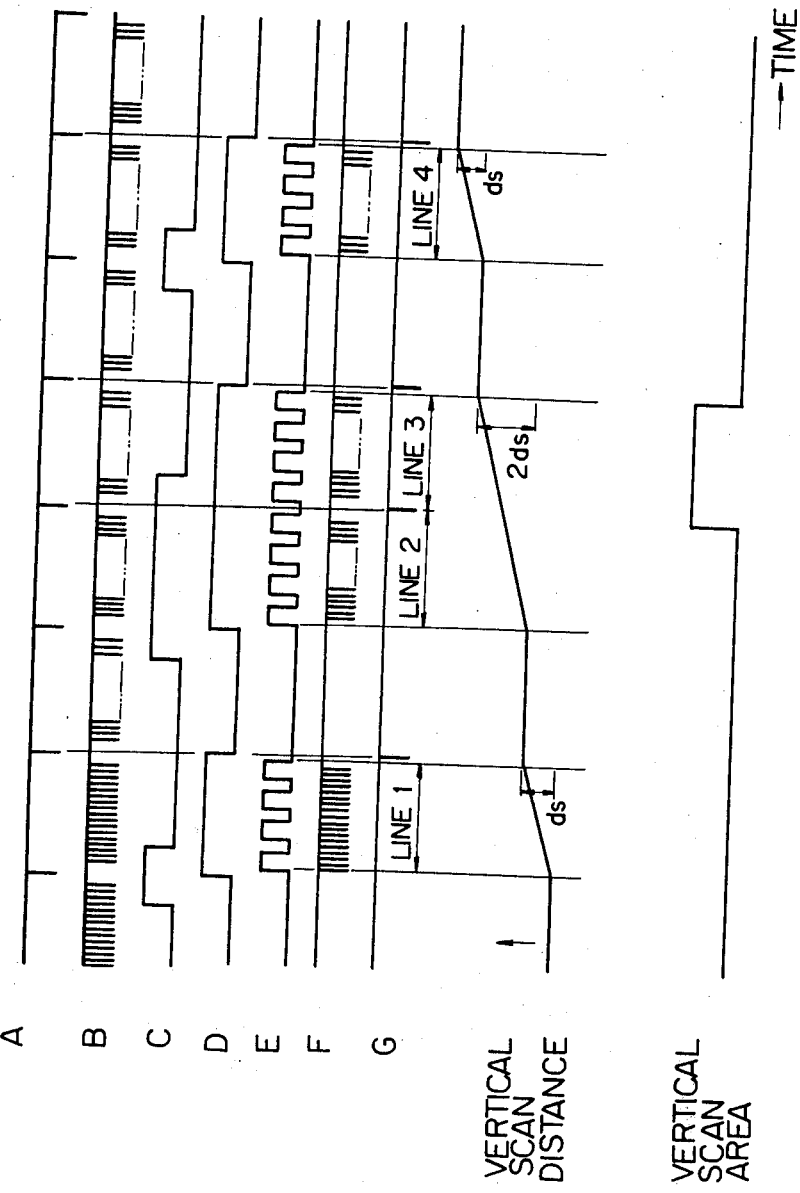
FIG. 2 is a timing diagram of a prior art optoelectronic scanning apparatus.

FIG. 2 shows the operation of a similar apparatus in accordance with the prior art. It will be seen that the signal D is initiated by the first pulse A which occurs when the read enable signal C is high and terminated by the first subsequent pulse A which occurs when the read enable signal C is low. The subscan pulses E and main scan pulses F are produced as long as the signal D is high. It will be seen in FIG. 2 that the scanning operation is interrupted between scan lines 1 and 2 and also between scan lines 3 and 4 due to insufficient available capacity in the buffer memory of the encoder 41.

It will be seen that each four pulses E cause the document 13 to be moved by one vertical scan increment or line, or by a distance ds. As mentioned hereinabove, when the scan operation is begun and the signals AVS are transferred from the photosensor elements to the shift register of the array 29 before the document 13 begins to move, the vertical scan area of each photosensor element is merely the area of the element itself. However, for the third scan line, the document 13 has moved by the distance ds before the transfer is made and the vertical scan area is equal to the distance ds multiplied by the horizontal width of the photosensor element plus the area of the element. This causes not only distortion of the image reproduced by the receiver but also the omission of image areas between scan lines.

Figure 3:
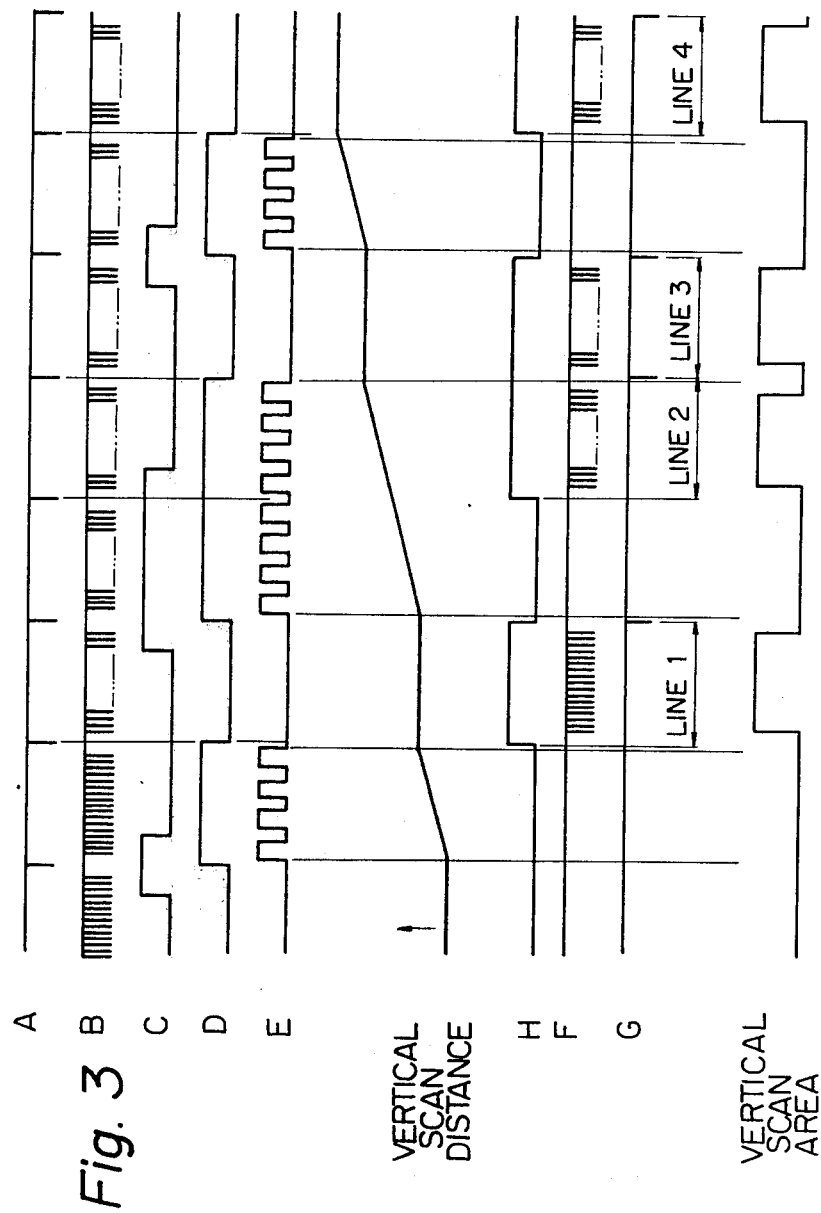
FIG. 3 is similar to FIG. 2 but illustrates the operation of the present invention.

The present apparatus 11 overcomes these serious problems in the manner illustrated in FIG. 3. This is accomplished by feeding the scan or sampling enable signal H to the sampling unit 38 rather than the signal D. The signal H has the same duration as the signal D but is delayed by one scan line, or the length of time required to move the document 13 by one increment. When scanning is begun or resumed in response to a high read enable signal C, the pulses F are gated to the sampling unit 38 in response to the next line synchronization signal A after the signal A which caused the subscan pulses E to be produced. In other words, the same numbers of subscan pulses E and main scan pulses F are produced in the prior art, but the main scan pulses F are delayed from the corresponding subscan pulses E by one scan interval. In this manner, the document 13 has always been moved by one distance ds before the transfer is made from the photosensor elements to the shift register of the array 29, and the vertical scan area will always be the same regardless of whether the scanning operation has just begun or is being performed continuously. This positively prevents loss of image area and distortion which is present in the prior art.

Figure 4:
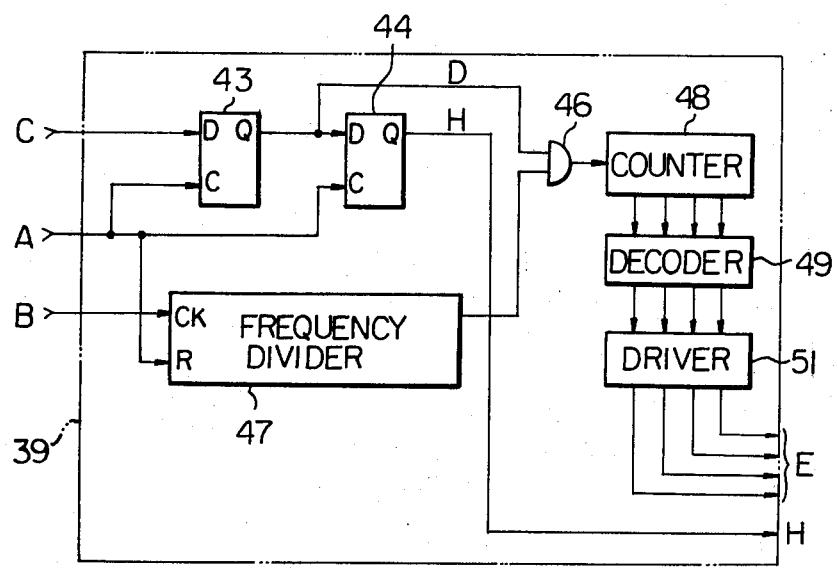
FIG. 4 is a schematic diagram of a control means of the present apparatus.

The motor drive unit 39 is shown in FIG. 4 as comprising a D type flip-flop 43. The signals C and A are applied to the D and C inputs of the flip-flop 43 respectively. The Q output of the flip-flop 43 constitutes the signal D and is connected to the D input of another flip-flop 44, the Q output of which constitutes the signal H. The pulses A are applied to the C input of the flip-flop 44. The Q output of the flip-flop 43 is connected to an input of an AND gate 46.

The pulses A are also applied to the reset input of a frequency divider 47, the output of which is connected to another input of the AND gate 46. The pulses B are applied to the clock input of the frequency divider 47.

The output of the AND gate 46 is connected to an input of a counter 48, the parallel outputs of which are connected to a decoder 49. The parallel outputs of the decoder 49 are connected to a driver 51 which produces the subscan pulses E at four parallel outputs thereof.

In operation, both flip-flops 43 and 44 are initially reset and the AND gate 46 inhibited by the low Q output of the flip-flop 43. This prevents frequency divided pulses B from the frequency divider 47 from reaching the counter 48. The low Q output of the flip-flop 44 inhibits scanning.

When the signal C goes high, the flip-flop 43 is set by the next pulse A. The resulting high signal D enables the AND gate 46 to pass frequency divided pulses B to the counter 48. The counter 48 and decoder 49 serve to further divide the frequency of the pulses B to a large extent to produce the four subscan pulses E. The pulses E are applied in parallel to the motor 21 from the driver 51 to sequentially energize four phases of the motor 21 and cause the pulley 22 to make one revolution.

If the signal C remains high when the next pulse A is produced, the flip-flop 43 will remain set. In this case, the next pulse A will set the flip-flop 44 since the Q output of the flip-flop 43 will be high at the time the next pulse A is produced. Thus, the signal H will become high to enable scanning at least until the time of yet another pulse A.

If the signal C is low when the next pulse A is produced, the flip-flop 43 will be reset. However, the flip-flop 44 will be set as in the preceding case.

The flip-flop 44 remains set to produce a high signal H until a pulse A is produced with the flip-flop 43 reset. This occurs at the end of the third scan line as shown in FIG. 3.

Figure 5:
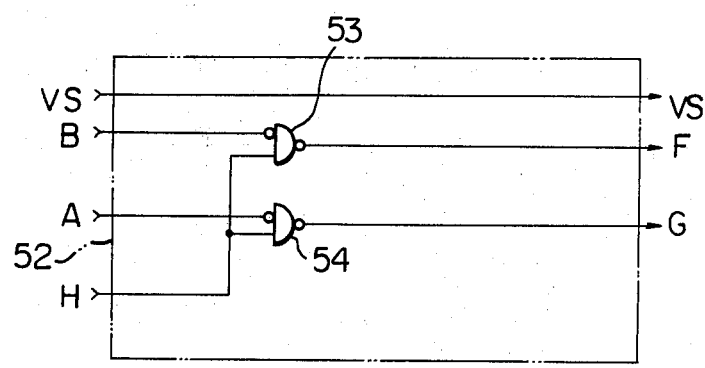
FIG. 5 is a schematic diagram of a gate means of the present apparatus.

A gate circuit 52 of the sampling unit 38 is shown in FIG. 5 and comprises NAND gates 53 and 54. The data signals VS pass straight through the circuit 52. The pulses B are applied to an inverting input of the NAND gate 53. The pulses B are applied to an inverting input of the NAND gate 54. The scan enable signal H is applied to inputs of both of the NAND gates 53 and 54. The pulses F and G appear at the outputs of the NAND gates 53 and 54 respectively.

The signal H, when high, enables the NAND gates 53 and 54. With the NAND gates 53 and 54 enabled, the pulses B and A are gated therethrough as the pulses F and G respectively after being inverted twice.

In summary, it will be seen that the present apparatus overcomes the problems of distortion and missing image information which has remained heretofore unsolved in the prior art. Various modifications will become possible for those skilled in the art after receiving the teachings of the present disclosure without departing from the scope thereof.

What is claimed is:

1. An optoelectronic scanning apparatus comprising:
    a charge accumulation type linear photosensor array;
    optical means for focussing a light image of a linear portion of an original document into the array;
    main scan means for continuously scanning the array to thereby scan the document in a main scan direction;
    subscan means for continuously producing relative movement between the document and the array by one increment each time the main scan means scans the array to thereby scan the document in a subscan direction which is perpendicular to the main scan direction;
    scan enable means for controlling the main scan means and subscan means to begin and continue scanning; and
    control means for controlling the main scan means to delay scanning the array while the subscan means produces relative movement between the document and array by one increment when the scan enable means controls the main scan means and subscan means to begin scanning.

2. An apparatus as in claim 1, in which the array is a CCD array.

3. An apparatus as in claim 1, in which the array comprises a plurality of photosensor elements, the apparatus further comprising pulse generator means for generating main scan pulses for causing the array to serially produce output signals of the elements, the control means controlling the pulse generator means to delay feeding the main scan pulses to the array when the scan enable means controls the main scan means and subscan means to begin scanning.

4. An apparatus as in claim 3, in which the pulse generator means comprises gate means controlled by the control means.

5. An apparatus as in claim 4, in which the control means comprises a flip-flop which is set and reset under control of the scan enable means and controls the gate means.

6. An apparatus as in claim 5, in which the pulse generator means further generates subscan pulses for causing the subscan means to produce relative movement between the document and array.

7. An apparatus as in claim 5, in which the pulse generator means further generates a line synchronization pulse each time the main scan means scans the array, the flip-flop being set and reset by the line synchronization pulses.

* * * * *